Sept. 8, 1970 J. W. FLEMING 3,527,908
RATE OF CHANGE LIMIT DEVICE
Original Filed Oct. 22, 1965 2 Sheets-Sheet 1
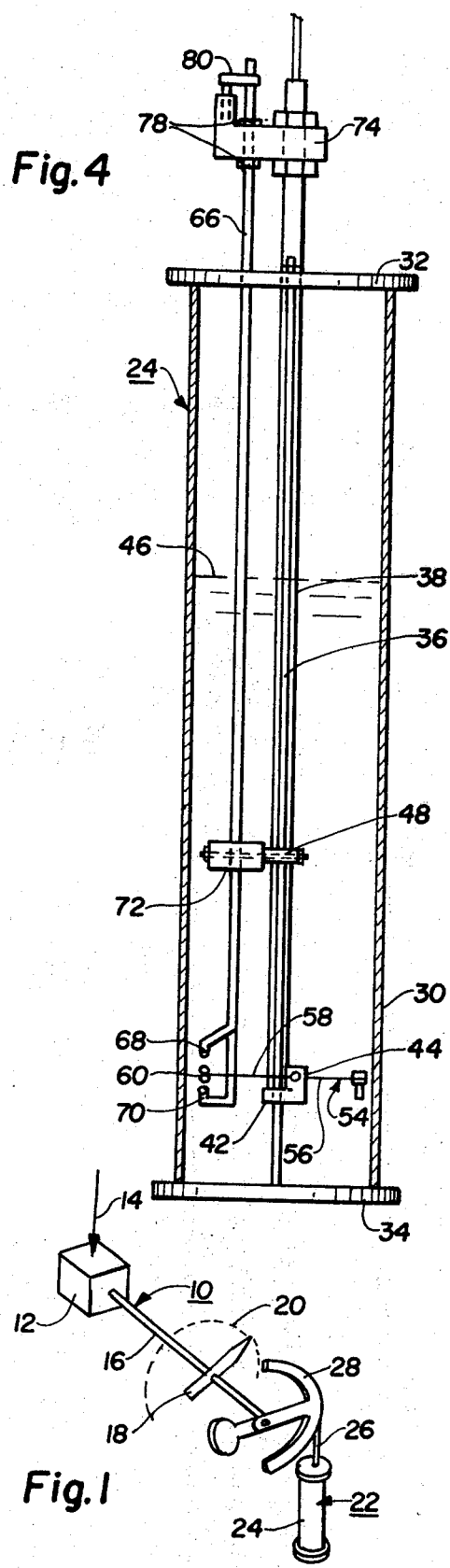
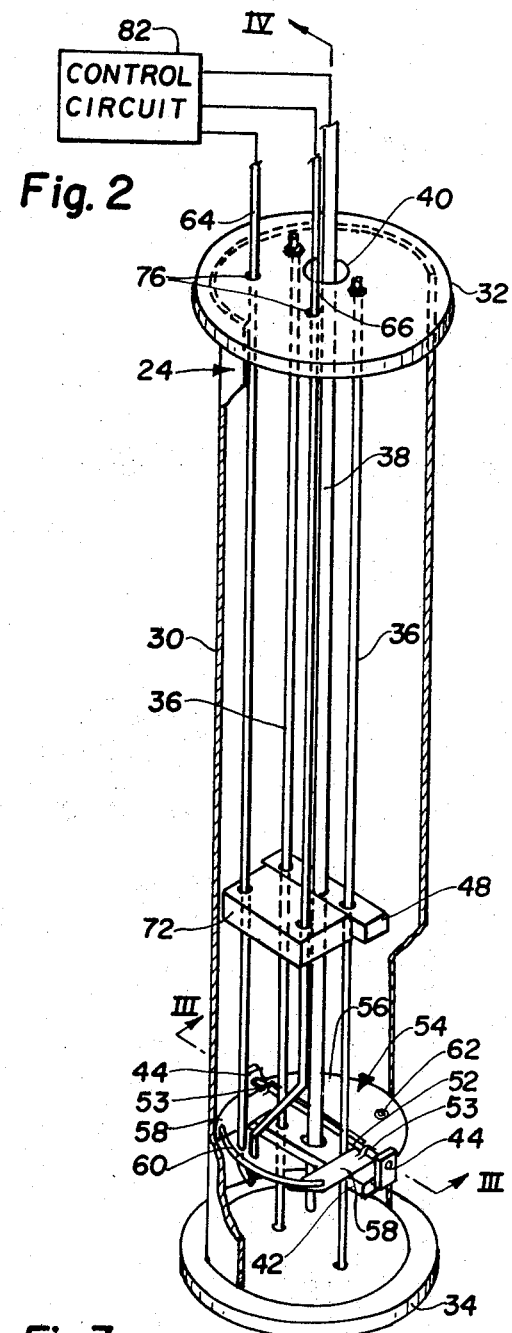
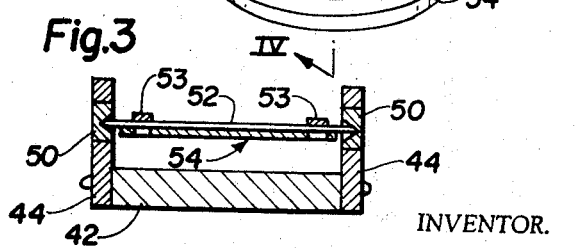
INVENTOR.
JOSEPH W. FLEMING
BY
Murray D. Linkhauer
ATTORNEYS

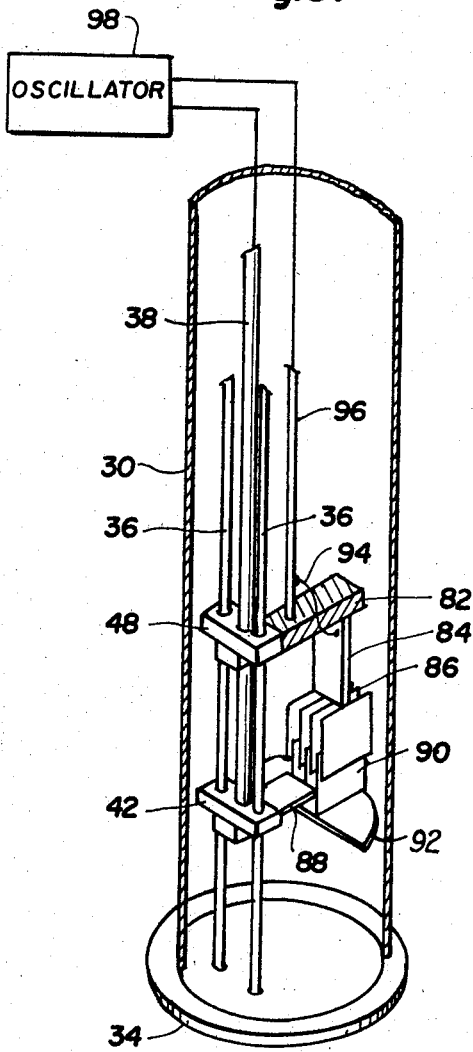

United States Patent Office 3,527,908
Patented Sept. 8, 1970

3,527,908
RATE OF CHANGE LIMIT DEVICE
Joseph W. Fleming, 1800 Kent Road,
Pittsburgh, Pa. 15241
Original application Oct. 22, 1965, Ser. No. 501,263, now Patent No. 3,436,956, dated Apr. 8, 1969. Divided and this application Oct. 8, 1968, Ser. No. 765,812
Int. Cl. H01h 35/40
U.S. Cl. 200—81.9                    9 Claims

ABSTRACT OF THE DISCLOSURE

Described is apparatus for determining when the rate of change of a moving body falls below or rises above a predetermined value by means including a pivotal vane disposed within a fluid medium and incorporating switch means responsive to pivotal movement of the vane in the medium beyond a predetermined limit for indicating a rate of change above or below that limit. The invention also encompasses means for shutting down a process line, machine or other instrumentality when the rate of change rises above or falls below the aforesaid limit.

CROSS-REFERENCES TO RELATED APPLICATION

This application is a division of copending application Ser. No. 501,263, filed Oct. 22, 1965, now Pat. No. 3,436,956.

BACKGROUND OF THE INVENTION

While not limited thereto, the present invention is particularly adapted for use in conjunction with various instruments designed to indicate the operating conditions of a machine, process or the like. In many such cases, it is necessary to determine the point at which the rate of change of a parameter indicated by the instrument falls below or rises above a predetermined value. In freeze point determining apparatus such as that shown in my copending application Ser. No. 501,263, for example, it is necessary to determine when the freezing point is being reached, and this can best be determined by sensing a drop in the rate of change of the temperature of the mixture whose freezing point is being determined. Prior to this invention, no satisfactory means has been provided for determining a reduction in the rate of change of temperature or other similar parameter in applications of this sort.

SUMMARY OF THE INVENTION

As an overall object, the present invention seeks to provide a novel rate of change limit device which may be used for determining the freezing point of liquid mixture and for other purposes.

More specifically, an object of the invention is to provide a rate of change limit device of the type described wherein a pivotal vane is disposed within a fluid medium such that pivotal movement of the vane in the medium beyond a predetermined limit will close an electrical switch.

In accordance with one embodiment of the invention, a rate of change limit device is provided comprising an elongated housing, a fluid within the housing, a vane positioned within the housing to resist movement through the fluid, and means for supporting the vane in a balanced condition when stationary and for pivotal movement about a line normal to the longitudinal axis of the housing. The vane and the vane supporting means are movable through the fluid, while an electrode is movable in unison with the vane and has an end spaced from the vane and positioned for engagement by the vane.

When the rate of change of the vane and its supporting means exceeds a predetermined limit, the vane will contact the electrode; whereas when the rate of change falls below the aforesaid predetermined limit, contact will be broken between the vane and electrode. As will be understood, the vane and electrode comprise two elements of an electrical switch which can be used in electrical circuitry to indicate when the rate of change of movement of the vane and its supporting means has risen above or fallen below the predetermined limit established by contact of the vane with the electrode.

In another embodiment of the invention, the aforesaid switch arrangement can be replaced with a capacitive or inductive detecting arrangement. In the capacitive arrangement, for example, one set of capacitor plates is fixed to a carrier moveable through a fluid, while another set of cooperating capacitor plates, provided with a vane, is secured to the same carrier through a leaf spring. In this manner, the spacing and/or area between the capacitor plates will be a function of the resistance encountered by the vane in the fluid; and this, in turn, is a function of the rate of change of movement of the carrier through the fluid. By connecting the capacitor to appropriate external circuitry, the variation in capacitance and rate of change can be detected and utilized to control a machine or process such that a given rate of change is not exceeded, for example. Likewise, a similar inductive arrangement can be provided wherein an inductive coil is fixed to a carrier and an iron core, provided with a vane, secured to the same carrier through a left spring whereby the extent to which the core extends into the coil is a function of the rate of change of the carrier through a fluid.

The above and other objects and features of the invention will become apparent from the following detailed description taken in connection with the accompanying drawings which form a part of this specification, and in which:

FIG. 1 is a perspective view of an indicating or recording device having the rate of change limit device of the present invention attached thereto;

FIG. 2 is an isometric view of one embodiment of the rate of change limit device of the invention;

FIG. 3 is a cross-sectional view taken along line III—III of FIG. 2 showing the manner in which the vane of the rate of change limit device is supported for pivotal movement on its carrier;

FIG. 4 is a cross-sectional view taken along line IV—IV of FIG. 2; and

FIG. 5 is an isometric view of another embodiment of the invention.

With reference now to the drawings, and particularly to FIG. 1, a temperature indicating device 10 is shown incorporating a conventional drive mechanism 12, responsive to an electrical signal on lead 14 proportional to temperature, which drives or rotates a shaft 16 in response to the temperature sensed by an external probe, not shown. As is conventional, a pointer 18 is secured to the shaft 16 and cooperates with a scale 20 to indicate the temperature sensed by the aforesaid probe. Also coupled to and operated by the shaft 16 is the rate of change limit device 22 of the present invention. As will be described, the rate of change limit device 22 is capable of limiting the rate of change of a variable which, in the example given, comprises the temperature sensed by the probe connected to the lead 14. The rate of change limit device comprises a cylindrical container 24 having a positioning rod connected to a flexible cable 26 which, in turn, is connected to the arcuate portion of the segment 28 connected to the shaft 16. In this manner, as the shaft 16 rotates in one direction, the cable 26 will move upwardly; whereas when the shaft rotates in the opposite direction, the cable 26 will move downwardly.

Reference is now directed to FIGS. 2–4 wherein the rate of change limit device 22 is shown in detail. The container 24 comprises an elongated housing 30 provided with upper and lower end plates 32 and 34 which close the opposite ends of the housing 30. Secured to and extending between the end plates 32 and 34 are spaced parallel guide rods 36. A positioning rod 38 extends between and parallel to the guide rods 36 up through an opening 40 in the upper end plate 32. A support block 42 is secured transversely across the lower end of the positioning rod and, as best shown in FIG. 3, carries a pair of bearing blocks 44 at its opposite ends. The elongated housing 30 is filled about halfway with a fluid, preferably oil, to the level 46 shown in FIG. 4. A guide block 48, formed from electrical insulating material, is secured to the positioning rod 38 at a distance from the support block 42. The guide rods 36 extends through the guide block 48 and thereby guide the positioning rod 38 during its vertical reciprocal movement, as will be described.

Received in the bearing blocks 44, as best shown in FIG. 3, are cup-shaped bearings 50 which receive the opposite, pointed ends of a balance pin 52. The balance pin 52 passes through U-shaped straps 53 stamped from a vane 54 such that the vane and the balance pin 52 can rotate within the bearings 50 as a unit. As shown, the vane 54 is positioned transversely across the housing 30 and, therefore, is positioned to resist movement through the oil contained therein. It is to be noted that the vane 54 comprises a generally semicircular portion 56 on one side of the balance pin 52 and a pair of spaced arms or plates 58 on the other side of the balance pin 52. In this manner, the surface area of the portion 56 on one side of the balance pin is much greater than that of the combined surface areas of the plates 58 on the opposite side of the pivot pin. Consequently, when the rod 38 is raised, the vane 54 pivots in a clockwise direction as viewed in FIGS. 2 and 4. Conversely, when the rod 38 is lowered, the vane 54 and the balance pin 52 will pivot in a counterclockwise direction as viewed in FIGS. 2 and 4. The two plates 58 on one side of the balance pin 52 are interconnected by means of an arcuate rod 60 which is brazed or otherwise securely fastened to the plates 58. The generally semicircular portion 56 of the vane 54 is provided with a counterweight 62 whereby the vane 54 is balanced and, if the absence of movement of positioning rod 38, is generally horizontal.

Extending downwardly through the upper end plate 32 is a pair of electrodes 64 and 66 whose ends comprise contacts 68 and 70. The electrodes 64 and 66 pass through an insulating block 72 carried by the guide block 48. Consequently, the electrodes 64 and 66 are movable, in unison, with the positioning rod 38. Secured to the upper end of the positioning rod 38 is an alignment block 74 (FIG. 4). The electrodes 64 and 66 extend upwardly through openings 76 in the upper end plate 32 and thence through openings in the alignment block 74. The electrodes are detachably connected to the alignment block 74 by means of nuts 78. That is to say, by loosening the nuts 78, the contacts 68 and 70 of the electrodes 64 and 66, respectively, may be moved toward or away from the rod 60 of the vane 54. Secured to the extreme upper end of each of the electrodes 64 and 66 is an inverted L-shaped aligning pin 80 having a downwardly-depending leg which is received in the alignment block 74. Only the pin 80 for electrode 66 is shown in FIG. 4, the other pin being identical as illustrated in my copending application Ser. No. 501,263, filed Oct. 22, 1965. The aligning pins 80 thus cooperate to maintain the contacts 68 and 70 of the electrodes 64 and 66 directly above and below the rod 60. The support-wire or cable 26 is secured to the positioning rod 38 and connects the rate of change limit device to the shaft 16 of the temperature indicating device 10 of FIG. 1. That is to say, as the shaft 16 of the temperature indicating device 10 rotates, the positioning rod 38 will be moved longitudinally through the housing 30. Therefore, in accordance with the direction of rotation of the shaft 16 and, consequently, the direction of movement of the positioning rod 38, the vane 54 will pivot into engagement with either of the contacts 68 or 70, assuming that the rate of change of movemen of the rod 38 is above a predetermined limit determined by the spacing between rod 60 and contacts 68 and 70.

In operation, the vane 54 is balanced about the balance pin 52 such that the rod 60 is spaced from the contact 68 by a predetermined distance as well as being spaced from the contact 70 by the same or a different predetermined distance. Furthermore, the surface areas of the plates 58 with respect to the portion 56 of the vane 54 are proportioned such that minute movement of the positioning rod 38 will cause the vane 54 to pivot into engagement with either of the contacts 68 or 70. For example, assuming that the positioning rod 38 is moved upwardly, the vane 54 will not pivot to cause the rod 60 to engage contact 68 until the velocity of the positioning rod exceeds a certain predetermined rate. Likewise, and assuming that the positioning rod 38 is moving downwardly, the vane 54 will not pivot such that rod 60 engages contact 70 until the velocity exceeds a predetermined limit.

As will be understood, when the vane 54 is in the balanced position shown, the positioning rod 38, block 42 and the vane 54 itself will be electrically insulated from the contacts 68 and 70. However, when the rod 60 of vane 54 engages contact 68, for example, an electrical circuit can be completed between the positioning rod 38 and the electrode 64. This electrical connection can then be used in external circuitry 82 to indicate that the velocity has exceeded the aforesaid predetermined limit. Similarly, when the velocity in the opposite direction exceeds the predetermined limit determined by the positioning of contact 70, a circuit is completed between positioning rod 38 and electrode 64 to indicate this fact. In this manner, external processes, machines or the like can be controlled to vary their operation, for example, depending upon whether the rate of change of the parameter indicated by the indicating device 10 is above or has fallen below a predetermined limit.

In FIG. 5, another embodiment of the invention is shown wherein elements corresponding to those of FIGS. 2 and 4 are identified by like reference numerals. In this case, the positioning rod 38 and guide rods 36 are offset with respect to the center of housing 30. The guide block 48, in this case, carries an insulating block or bar 82 in cantilever fashion; and depending downwardly from the block 82 is a bar 84 of electrically conductive material which carries a first plurality of capacitor plates 86 at its lower extremity. Support block 42 has secured thereto in cantilever relationship a flat leaf spring 88 which, at its outer extremity, carries, a second plurality of capacitor plates 90 which are interleaved with the plates 86. Secured to the bottom of the capacitor plates 90 is a semicircular vane 92 which corresponds to the vane 54 of FIGS. 2 and 4. The member 84 is connected through conductor 94 to an electrode 96; and the electrode 96 and positioning rod 38 are connected, for example, to the tank circuit of an oscillator 98.

With the arrangement shown, variations in the movement of the capacitor plates 90 within plates 86 will vary the capacitance of the tank circuit of oscillator 98 and, hence, vary the frequency and/or amplitude of the output oscillations. This variation can then be used in circuitry to control a machine, process or the like as a function of the rate of change of the guide rod and support block 42 in moving through a liquid, such as oil, within the housing 30.

It will be appreciated that the upper capacitor plates 86, for example, could be replaced by an inductive coil and the lower capacitor plates 90 replaced by an iron core movable into and out of the coil and having the van 92 and leaf spring 88 secured thereto. In this case, the variation in inductance of the inductor as a function of the extent to which the iron core extends into the coil can be used in external circuitry to again determine the rate of change and control a machine or process as a function thereof.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A rate of change limit device, comprising an elongated housing, end plates closing the opposite ends of said housing, a liquid within said housing, a vane positioned to resist movement through said liquid, means for supporting said vane in a balanced condition when stationary and for pivotal movement about a line normal to the longitudinal axis of said housing when moving, both said vane and said vane supporting means being immersed in said liquid and movable through the liquid, and electrical circuit means connected to said vane for indicating when said vane has pivoted about said line beyond a predetermined limit.

2. The device of claim 1 wherein said vane is supported on a balance pin carried at its opposite ends in bearings on said supporting means, and wherein said electrical circuit means includes contacts on either side of said vane and engageable with said vane when it pivots about said line normal to the longitudinal axis of said housing.

3. The device of claim 1 wherein said vane is carried at one end of a cantilever leaf spring and said electrical circuit means includes first capacitor plate means carried on said leaf spring and second capacitor plate means fixed to said supporting means whereby movement of said vane and said first capacitor plate means relative to said second capacitor plate means will vary the capacitive coupling therebetween.

4. The device of claim 4 wherein said first and second capacitor plate means are connected in the tank circuit of an oscillator.

5. The device of claim 1 wherein said circuit means includes an inductive device and the inductance of said inductive device is varied when said vane pivots about said line.

6. The device of claim 1 including an electrode movable in unison with said vane and having an end spaced from said vane and positioned for engagement by said vane, circuit means including said vane and said electrode for controlling a process operation which effects a change in a process variable, and means connected to said vane supporting means for moving said vane and said electrode at velocities corresponding to the rate of change of said process variable, whereby said vane will contact said electrode to complete said circuit means when the rate of change of said variable exceeds a preselected rate of change, and said vane will be disengaged from said electrode to open said circuit means when the rate of change of said variable falls below said preselected rate of change.

7. The device of claim 7 wherein said electrode is adjustably supported whereby the spacing between its end and said vane may be varied to effect a change in said preselected rate of change.

8. The device of claim 7 wherein said electrode is positioned to engage said vane when said process variable decreases in value.

9. The device as defined in claim 7 wherein said electrode is positioned to engage said vane when said process variable increases in value.

References Cited
UNITED STATES PATENTS

| | | | |
|---|---|---|---|
| 1,931,791 | 10/1933 | Dueringer | 200—81.9 XR |
| 2,513,863 | 7/1950 | Havens | 116—117 XR |
| 2,577,104 | 12/1951 | Butler | 200—81.9 |
| 3,148,254 | 9/1964 | Clason | 200—81.9 |
| 3,162,847 | 12/1964 | Huffman | 200—81.9 XR |
| 3,276,380 | 10/1966 | Stevenson | 200—81.9 XR |

ROBERT K. SCHAEFER, Primary Examiner

J. R. SCOTT, Assistant Examiner

U.S. Cl. X.R.

116—117